(12) United States Patent
Taguchi et al.

(10) Patent No.: US 12,092,154 B2
(45) Date of Patent: Sep. 17, 2024

(54) BEARING STRUCTURE

(71) Applicant: Panasonic Intellectual Property Management Co., Ltd., Osaka (JP)

(72) Inventors: Hidetoshi Taguchi, Osaka (JP); Takumi Hikichi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 132 days.

(21) Appl. No.: 17/800,812

(22) PCT Filed: Dec. 15, 2020

(86) PCT No.: PCT/JP2020/046795
§ 371 (c)(1),
(2) Date: Aug. 18, 2022

(87) PCT Pub. No.: WO2021/166395
PCT Pub. Date: Aug. 26, 2021

(65) Prior Publication Data
US 2023/0082964 A1    Mar. 16, 2023

(30) Foreign Application Priority Data

Feb. 20, 2020    (JP) .................................. 2020-027071

(51) Int. Cl.
*F16C 17/02*    (2006.01)
*F16C 27/06*    (2006.01)
*F16C 35/02*    (2006.01)

(52) U.S. Cl.
CPC .......... *F16C 17/024* (2013.01); *F16C 27/063* (2013.01); *F16C 35/02* (2013.01)

(58) Field of Classification Search
CPC ...... F16C 17/024; F16C 27/02; F16C 27/063; F16C 35/02
See application file for complete search history.

(56) References Cited

U.S. PATENT DOCUMENTS

| 4,254,614 | A | * | 3/1981 | Miyamoto | ............... | D01H 4/12 |
| | | | | | | 57/406 |
| 6,786,642 | B2 | * | 9/2004 | Dubreuil | ............... | F16C 17/024 |
| | | | | | | 384/106 |

(Continued)

FOREIGN PATENT DOCUMENTS

| EP | 3754213 A1 | 12/2020 |
| JP | H04128525 U | 11/1992 |

(Continued)

OTHER PUBLICATIONS

International Search Report and Written Opinion issued for International Patent Application No. PCT/JP2020/046795, Date of mailing: Feb. 22, 2021, 12 pages including English translation of Search Report.

*Primary Examiner* — James Pilkington
(74) *Attorney, Agent, or Firm* — HSML P.C.

(57) ABSTRACT

A bearing structure (100) of the present disclosure includes: a rotating shaft (11); a dynamic bearing (12) including a foil (22) and a foil holder (21), the foil (22) being disposed around the rotating shaft (11) to constitute a bearing surface, the foil holder (21) holding the foil (22); a bearing support member (13) disposed around the dynamic bearing (12) to support the dynamic bearing (12); and at least one elastic body (14) disposed between the bearing support member (13) and the foil holder (21).

11 Claims, 7 Drawing Sheets

(56) References Cited

U.S. PATENT DOCUMENTS

| | | | | |
|---|---|---|---|---|
| 7,394,175 | B2* | 7/2008 | McAuliffe | F04D 29/584 |
| | | | | 310/90 |
| 10,371,156 | B2* | 8/2019 | Colson | F16C 17/024 |
| 2004/0042693 | A1* | 3/2004 | Dubreuil | F16C 17/024 |
| | | | | 384/106 |
| 2008/0253705 | A1 | 10/2008 | Struziak et al. | |
| 2011/0243762 | A1* | 10/2011 | Daikoku | F16C 17/024 |
| | | | | 384/105 |

FOREIGN PATENT DOCUMENTS

| | | | |
|---|---|---|---|
| JP | 2001516856 | A | 10/2001 |
| JP | 2005536697 | A | 12/2005 |
| JP | 2008261495 | A | 10/2008 |
| JP | 2015183567 | A | 10/2015 |
| JP | 2018091365 | A | 6/2018 |
| JP | 2019138441 | A | 8/2019 |
| WO | 9914510 | A1 | 3/1999 |
| WO | 2004020851 | A1 | 3/2004 |

* cited by examiner

BEARING STRUCTURE

TECHNICAL FIELD

The present disclosure relates to a bearing structure. The technique of the present disclosure is applicable to rotating machines, such as compressors, expansion turbines, and exhaust gas turbine superchargers.

BACKGROUND ART

Fluid bearings are bearings configured to generate a support force by a fluid film. Fluid bearings include static bearings and dynamic bearings. Static bearings require to be externally supplied with a compressed fluid. Dynamic bearings do not require to be externally supplied with a compressed fluid, and use a dynamic pressure generated in a fluid as a support force.

As one type of dynamic bearings, foil bearings are known. Foil bearings have a bearing surface constituted from one or more flexible thin sheets (foils). Patent Literature 1 describes a leaf-type foil bearing (FIG. 7) and a bump-type foil bearing (FIG. 8).

CITATION LIST

Patent Literature

Patent Literature 1: JP 2018-91365 A

SUMMARY OF INVENTION

Technical Problem

Dynamic bearings do not require a pressurizing mechanism for compressing a fluid in advance. For this reason, dynamic bearings, especially foil bearings, are useful for downsizing rotating machines, such as expansion turbines, turbocompressors, and turbochargers.

There is a tendency that the more the rotating machines become downsized, the more the rotating machines increase in rotational speed. For a further downsizing of the rotating machines, it is required to further improve the reliability of the bearing structure in a high-speed rotation range.

Solution to Problem

A bearing structure according to the present disclosure includes:
a rotating shaft;
a dynamic bearing including a foil and a foil holder, the foil being disposed around the rotating shaft to constitute a bearing surface, the foil holder holding the foil;
a bearing support member disposed around the dynamic bearing to support the dynamic bearing; and
at least one elastic body disposed between the bearing support member and the foil holder.

Advantageous Effects of Invention

According to the present disclosure, it is possible to improve the reliability of the bearing structure in a high-speed rotation range.

Figure 1:
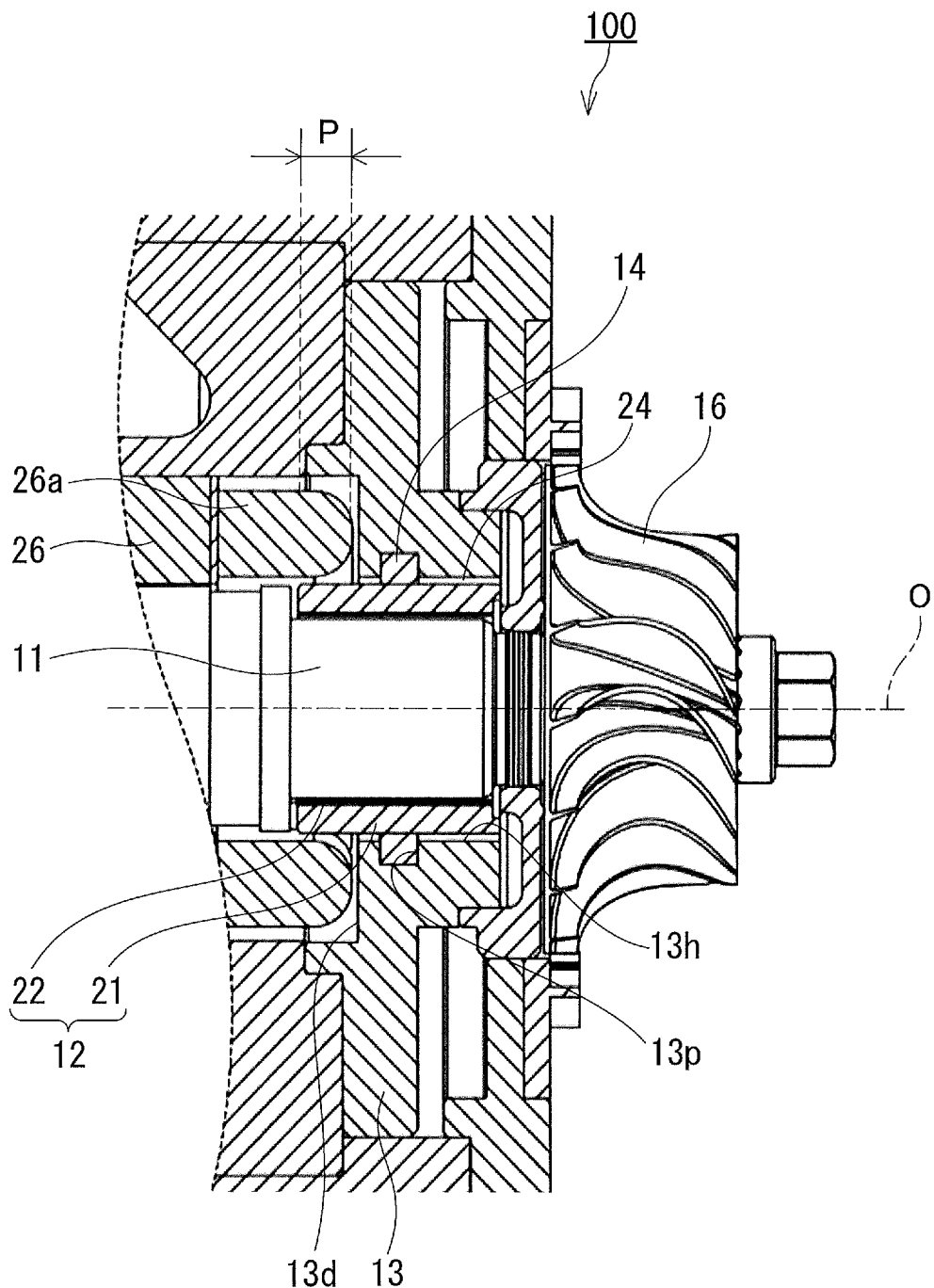
FIG. 1 is a cross-sectional view of a bearing structure according to Embodiment 1.

DESCRIPTION OF EMBODIMENTS (Findings Etc. On which the Present Disclosure is Based)

One of important properties of fluid bearings is the bearing stiffness. The bearing stiffness is a property specified by the magnitude of elastic displacement (deflection) of a bearing occurred in response to application of a load. The bearing stiffness of static bearings can be adjusted by varying the fluid pressure. In contrast, the bearing stiffness of dynamic bearings cannot be adjusted.

The bearing stiffness (support stiffness) of a dynamic bearing varies depending on the rotational speed of a rotating shaft. In particular, the bearing stiffness sometimes increases rapidly in a high-speed rotation range due to the structural factor of a foil generating a dynamic pressure. An increase in bearing stiffness is considered to be seemingly desirable. In some cases, however, with a rapid increase in bearing stiffness in the high-speed rotation range, the critical speed of the rotating system transitions to the high-speed rotation range. When the critical speed transitions to the high-speed rotation range, the sudden occurrence of resonance and the input of a high load in the high-speed rotation range not only cause a significant decrease in rotational stability and quiet performance, but also might damage parts such as a bearing and a rotating shaft.

Foil bearings, which are one type of dynamic bearings, can damp vibration by deformation of a foil occurred in response to application of a load, and accordingly have been conventionally considered to be resistant to vibration. However, in a high-speed rotation range of around 100,000 turns, the dynamic bearings have extremely high stiffness and have poor damping properties. The foil bearings are no exception.

Bearings having poor damping properties have difficulty in suppressing resonance once occurred and vibration caused by an unbalance force.

Based on these findings, the present inventors came to constitute the subject matter of the present disclosure.

Thus, the present disclosure provides a technique for imparting damping capacity to a dynamic bearing and suppressing an excessive increase in bearing stiffness. This improves the reliability of a bearing structure in a high-speed rotation range.

Hereinafter, embodiments will be described in detail with reference to the drawings. However, more detailed description than necessary may be omitted. For example, detailed description of a well-known matter or overlapping description of substantially the same configuration may be omitted. This is to prevent the following description from being unnecessarily redundant and facilitate the understanding by those skilled in the art.

The accompanying drawings and the following description are provided for those skilled in the art to fully understand the present disclosure, and are not intended thereby to limit the subject matter recited in the claims.

Embodiment 1

Hereinafter, Embodiment 1 will be described with reference to FIG. 1 to FIG. 3.

[1-1. Configuration]

FIG. 1 is a cross-sectional view of a bearing structure 100 according to Embodiment 1. The bearing structure 100 includes a rotating shaft 11, a dynamic bearing 12, a bearing support member 13, and an elastic body 14. The elastic body 14 is disposed between the dynamic bearing 12 and the bearing support member 13. The elastic body 14 and a gaseous film in the dynamic bearing 12 constitute a series spring to function to exhibit the stiffness of the bearing structure 100. That is, the elastic body 14 imparts damping capacity to the bearing structure 100 and suppresses an excessive increase in bearing stiffness of the bearing structure 100. This can improve the reliability of the bearing structure 100 in a high-speed rotation range.

The type of a gas generating the gaseous film in the dynamic bearing 12 is not particularly limited. The gas generating the gaseous film is determined according to the rotating machine to which the bearing structure 100 is applied. The gas generating the gaseous film may be a working fluid for the rotating machine. The gas generating the gaseous film is, for example, a refrigerant or air.

The rotating shaft 11 is supported by the dynamic bearing 12. To one end portion of the rotating shaft 11, a rotating element 16, such as an impeller or a turbine wheel is attached.

The dynamic bearing 12 includes a foil holder 21 and at least one foil 22. The foil holder 21 is a cylindrical member. The foil 22 is provided inside the foil holder 21. The foil 22 is a member that is disposed around the rotating shaft 11 to constitute a bearing surface. The foil 22 is typically a metal thin sheet. The foil bearing exhibits high stiffness and is suitable for rotating machines operated at a high rotational speed.

Figure 2A:
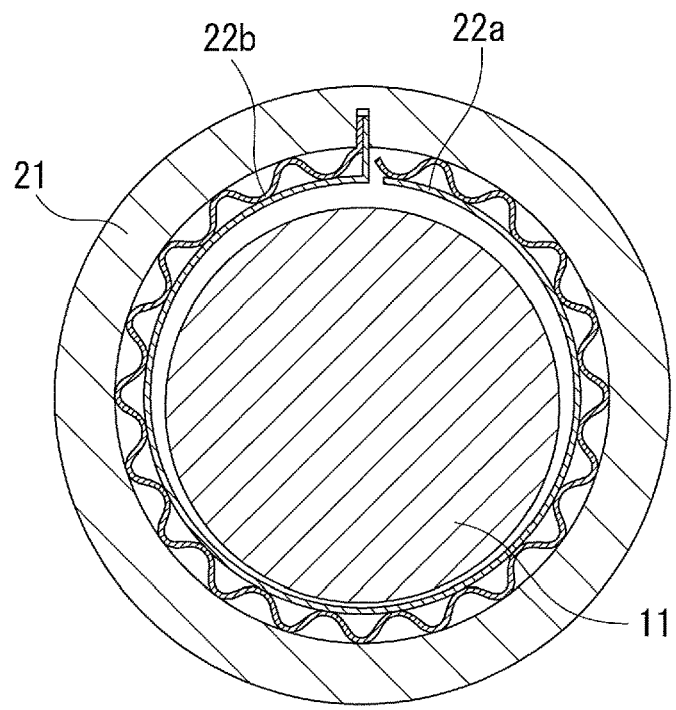
FIG. 2A is a cross-sectional view of a dynamic bearing, taken perpendicularly to the axial direction of a rotating shaft.
Figure 3:
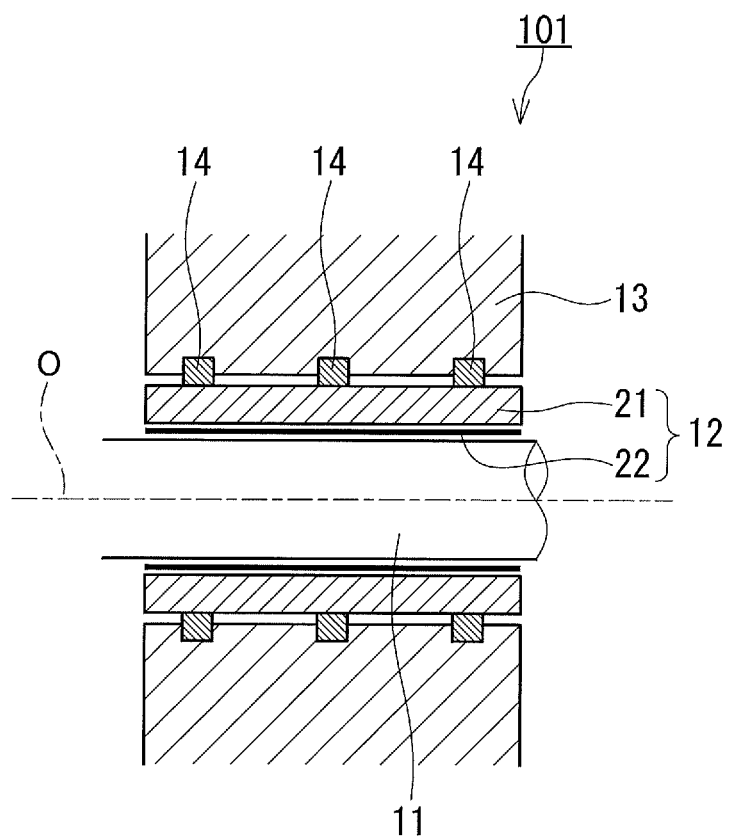
FIG. 3 is a cross-sectional view of a bearing structure according to a modification.

FIG. 2A is a cross-sectional view of the dynamic bearing 12, taken perpendicularly to the axial direction of the rotating shaft 11. In the example shown in FIG. 2A, the dynamic bearing 12 includes the foil holder 21, a top foil 22a, and a bump foil 22b. The dynamic bearing 12 can be a bump-type foil bearing. The bump foil 22b is a corrugated foil and is disposed on the inner circumferential surface of the foil holder 21. The top foil 22a is flat and is disposed on the bump foil 22b. A gaseous film is formed between the top foil 22a and the rotating shaft 11.

Figure 2B:
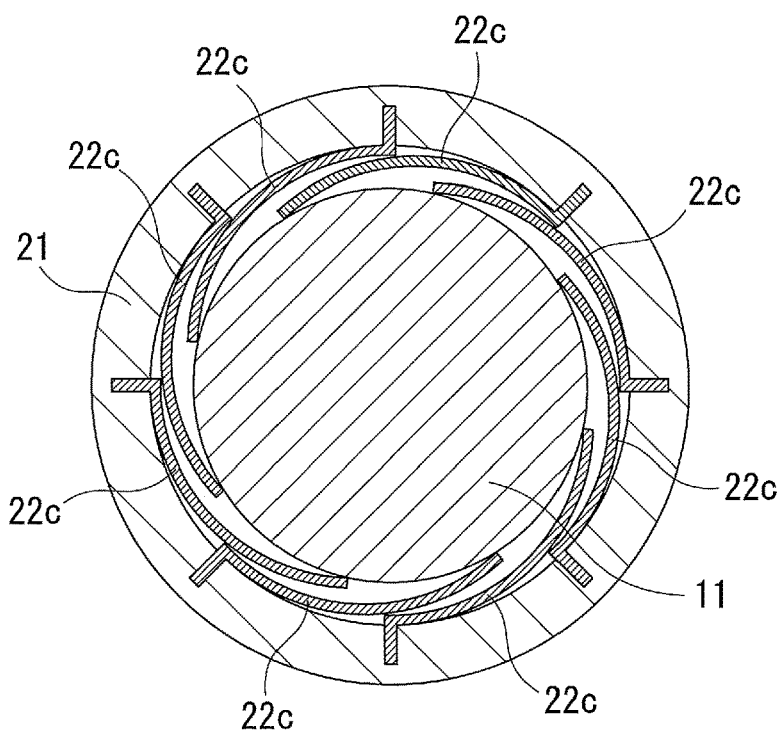
FIG. 2B is another cross-sectional view of the dynamic bearing, taken perpendicularly to the axial direction of the rotating shaft.

FIG. 2B is another cross-sectional view of the dynamic bearing 12, taken perpendicularly to the axial direction of the rotating shaft 11. In the example shown in FIG. 2B, the dynamic bearing 12 includes the foil holder 21 and a plurality of leaf foils 22c. The dynamic bearing 12 may be a leaf-type foil bearing. One end portion of each of the leaf foils 22c is a fixed end that is fixed to the foil holder 21. The other end portion of each of the leaf foils 22c is a free end that is swingable in the radial direction.

As shown in FIG. 1, the bearing support member 13 is disposed around the dynamic bearing 12 to support the dynamic bearing 12. The bearing support member 13 has a holding hole 13h extending through in a direction parallel to an axis O of the rotating shaft 11. The foil holder 21 of the dynamic bearing 12 is disposed in the holding hole 13h. In the present embodiment, only a portion of the foil holder 21 is placed in the holding hole 13h. However, the entire foil holder 21 may be placed in the holding hole 13h. The bearing support member 13 is fixed to a housing or the like of the rotating machine. The dynamic bearing 12 is fixed to the housing or the like of the rotating machine via the elastic body 14 and the bearing support member 13.

The bearing support member 13 has a groove 13p. The elastic body 14 is disposed in the groove 13p. The groove 13p is annular. The groove for positioning the elastic body 14 may be provided in the foil holder 21, or may be provided across both the bearing support member 13 and the foil holder 21.

The elastic body 14 is disposed between the bearing support member 13 and the foil holder 21. The bearing support member 13 supports the foil holder 21 via the elastic body 14. The outer circumferential surface of the foil holder 21 and the inner circumferential surface of the holding hole 13h of the bearing support member 13 have a gap 24 therebetween. The gap 24 allows the elastic body 14 to become elastically deformed to displace the dynamic bearing 12 in the radial direction of the rotating shaft 11. The gap 24 is ensured from one opening end to the other opening end of the holding hole 13h except for a portion occupied by the elastic body 14. That is, the foil holder 21 is not directly in contact with the bearing support member 13. The function of the elastic body 14 can be reliably exerted by the gap 24. The dimension of the gap 24 in the radial direction is, for example, 0.01 mm to 0.04 mm.

The elastic body 14 is a ring-shaped member and is in close contact with the dynamic bearing 12 in the circumferential direction. Specifically, over 360 degrees, the elastic body 14 is in close contact with the outer circumferential surface of the foil holder 21 of the dynamic bearing 12. According to such a configuration, the function of the elastic body 14 can be isotropically exhibited around the dynamic bearing 12.

The material of the elastic body 14 is not particularly limited. The elastic body 14 may be formed of a resin or a metal. In the case where the elastic body 14 is formed of a resin, the rubber elasticity can be imparted to the elastic body 14 regardless of the shape of the elastic body 14. In the case where the elastic body 14 is formed of a metal, a metal member having a shape capable of exhibiting the elasticity, such as a hollow O-ring or an O-ring having a C-shaped cross section, is suitable as the elastic body 14 according to the present embodiment. The members other than the elastic body 14, such as the rotating shaft 11, the dynamic bearing 12, and the bearing support member 13, can be formed of a metal.

Upon receiving a load from the dynamic bearing 12, the elastic body 14 generates a reaction force corresponding to the load within the range of the length of the bearing surface in the axial direction of the rotating shaft 11. That is, regardless of the number of the elastic bodies 14 being one or plural, all the elastic bodies 14 are provided within the range of the length of the bearing surface in the axial direction of the rotating shaft 11. Such a configuration facilitates to avoid the occurrence of an unexpected vibration.

One or more elastic bodies 14 may be arranged such that the highest reaction force is exerted when a load is applied to the central position of the bearing surface in the axial direction of the rotating shaft 11. At this time, the effect by the elastic bodies 14 can be obtained to the maximum.

In the present embodiment, the bearing structure 100 has only one elastic body 14. In this case, the properties of the bearing structure 100, such as the stiffness and the damping properties, can be easily predicted by simulation. Moreover, problems of unavoidable errors, such as dimensional tolerances between parts, are less likely to occur. The elastic body 14 is disposed at a position corresponding to the central position of the bearing surface in the axial direction of the rotating shaft 11.

However, the number of the elastic bodies 14 is not particularly limited. FIG. 3 is a cross-sectional view of the bearing structure 101 according to a modification. As shown in FIG. 3, a plurality of elastic bodies 14 may be arranged in a direction parallel to the axial direction of the rotating shaft 11. The intervals between the adjacent elastic bodies 14 are equal. The plurality of elastic bodies 14 act as parallel springs. In the case where the plurality of elastic bodies 14 are arranged in the axial direction of the rotating shaft 11, the properties of the bearing structure 101 can be predicted by regarding the plurality of elastic bodies 14 as parallel springs.

In the case where the plurality of elastic bodies 14 are arranged in the direction parallel to the axial direction of the rotating shaft 11, the number of the elastic bodies 14 may be odd. In other words, the number of the at least one elastic body 14 may be odd. In this case, a specific elastic body 14 can be disposed at a position corresponding to the central position of the bearing surface in the axial direction of the rotating shaft 11. Such a configuration facilitates a uniform support force to act on the dynamic bearing 12 along the axial direction.

Note that actual products always have a dimensional tolerance between parts even though the use of a plurality of elastic bodies 14 of the same design is intended. There is also an assembly error. In this case, the support force exerted on the dynamic bearing 12 by the bearing support member 13 might be non-uniform in the axial direction. From this viewpoint, the bearing structure 100 (FIG. 1) having only one elastic body 14 is advantageous.

As shown in FIG. 1, in the present embodiment, the cross-sectional shape of the elastic body 14 is rectangular. The cross-sectional shape of the groove 13*p* is also rectangular. However, in a cross section parallel to the rotating shaft 11 and including the axis O of the rotating shaft 11, the cross-sectional shape of the elastic body 14 is not particularly limited. The elastic body 14 may have a circular or elliptical cross section, and may be hollow.

The bearing structure 100 may further include an electric motor 26 (or an electric generator). The electric motor 26 is attached to the rotating shaft 11. The foil holder 21 overlaps the electric motor 26 in a zone P in the axial direction of the rotating shaft 11. In the zone P, a portion of the foil holder 21 is surrounded by a portion of the electric motor 26. Specifically, the portion of the foil holder 21 is surrounded by a winding portion 26*a* of the electric motor 26. That is, the foil holder 21 is positioned slightly inside the electric motor 26. In the present embodiment, the bearing support member 13 has an annular step portion 13*d* provided around the holding hole 13*h*. The winding portion 26*a* of the electric motor 26 is placed in a space ensured by the step portion 13*d*. According to such a structure, the rotating shaft 11 can be designed to be short such that a resonance frequency appears at a higher rotational speed. In addition, in the present embodiment, providing only one elastic body 14 is advantageous from the viewpoint of having the step portion 13*d* of a sufficient depth. The length of the gap 24 in the axial direction being shorter than the length of the bearing surface in the axial direction contributes to having the step portion 13*d*. However, as shown in the modification in FIG. 3, the length of the gap 24 in the axial direction may be equal to the length of the bearing surface in the axial direction.

[1-2. Operation]

The operation of the bearing structure 100 configured as described above will be described below with reference to FIG. 1.

When the rotating shaft 11 rotates, a gas is sucked into a gap between the rotating shaft 11 and the foil 22 and is compressed. This generates a high pressure toward the radial direction of the rotating shaft 11 to hold the rotating shaft 11 at a predetermined position. The high pressure generated by the foil 22 serves as a force supporting the rotating shaft 11. Since the foil 22 is fixed to the foil holder 21, movement of the foil 22 due to a reaction force is prevented.

The rotating shaft 11 is held at the predetermined position by the bearing support member 13 via the foil 22, the foil holder 21, and the elastic body 14. The rotating shaft 11 has an amount of unbalance that cannot be removed in manufacturing. This amount of unbalance is also referred to as "balance quality". As defined in Japanese Industrial Standards, JIS B 0905 (1992), there are a recommended level and the upper limit of balance quality depending on the type and application of the rotating machine. When the rotating shaft 11 rotates, an unbalance force is generated, which is represented by the product of the amount of unbalance and the square of the rotational angular velocity. When a gas is sucked into the gap between the rotating shaft 11 and the foil 22, the sucked gas generates a gaseous film in the gap between the rotating shaft 11 and the foil 22. The gaseous film has a pressure higher than the pressure of the gas existing around the rotating shaft 11. The pressure of the gaseous film serves as a support force for the rotating shaft 11 of the bearing structure 100. The pressure of the gaseous film depends mainly on the cross-sectional shape of a space formed between the rotating shaft 11 and the foil 22. The cross-sectional shape is the shape of the cross section in the direction perpendicular to the rotating shaft 11. The cross-sectional shape of the space is determined by a deflection of the foil 22 depending on the pressure of the gaseous film. Accordingly, the foil 22 becomes deflected until an optimum gaseous film is generated that balances an unbalance force under the condition that the rotational speed of the rotating shaft 11 is constant, that is, under the condition that the unbalance force is constant. This determines the cross-sectional shape of the gaseous film in the direction perpendicular to the axial direction.

In the case where the dynamic bearing 12 is a leaf-type foil bearing, one end portion of each of the foils 22 is fixed to the foil holder 21. The other end portion of each of the foils 22 is a free end. When the other end portion of the foil 22 is pressed by the rotating shaft 11, the other end portion of the foil 22 slides in the circumferential direction along with the deflection of the foil 22 in the radial direction. However, since the length of the foil 22 is limited, such a deformation of the foil 22 is also limited. After the deformation of the foil 22 exceeds the deformation limit, the foil 22 does not become deflected any further though the rotational speed of the rotating shaft 11 increases. The pressure of the gaseous film increases to generate a pressure higher than the pressure of the gaseous film depending on an unbalance force. As a result, the stiffness of the gaseous film increases.

The elastic body 14 is disposed between the foil holder 21 and the bearing support member 13. Thus, the elastic body 14 constitutes a series spring with a gaseous film. The stiffness of the elastic body 14 functions as the stiffness of the bearing structure 100. When the stiffness of the gaseous film is defined as K1 and the stiffness of the elastic body 14 is defined as K2, a stiffness K of the bearing structure 100 is represented by the following equation (1). According to the equation (1), the stiffness of the bearing structure 100 is influenced not only by the stiffness of the gaseous film but also by the stiffness of the elastic body 14. The stiffness of the elastic body 14 is constant. Accordingly, even when only the stiffness of the gaseous film significantly increases, the elastic body 14 suppresses a significant increase in stiffness of the entire bearing structure 100.

$$K=1/(K1^{-1}+K2^{-1}) \quad (1)$$

[1-3. Effects Etc.]

As described above, in the present embodiment, the at least one elastic body 14 is disposed between the bearing support member 13 and the foil holder 21.

According to such a configuration, the stiffness of the bearing structure 100 is calculated based on a model in which an air film and the elastic body 14 act as a series spring. The stiffness of the elastic body 14 is constant. Accordingly, even when only the stiffness of the gaseous film significantly increases, the elastic body 14 suppresses an increase in stiffness of the entire bearing structure 100. The same is true even when the stiffness of the gaseous film exceeds the stiffness of the elastic body 14. As a result, resonance in a high-speed rotation range is prevented, and vibration due to an unbalance force is suppressed as well, thereby improving the reliability and the quiet performance of the bearing structure 100.

In the present embodiment, upon receiving a load from the dynamic bearing 12, the elastic body 14 may generate a reaction force corresponding to the load within the range of the length of the bearing surface in the axial direction of the rotating shaft 11. Such a configuration facilitates to avoid the occurrence of an unexpected vibration.

In the present embodiment, the elastic body 14 may be a ring-shaped member, and may be in close contact with the bearing support member 13 and the foil holder 21 in the circumferential direction. According to such a configuration, the function of the elastic body 14 can be exerted isotropically around the dynamic bearing 12.

In the present embodiment, the bearing support member 13 may have the holding hole 13*h* extending through in the direction parallel to the axial direction of the rotating shaft 11. The foil holder 21 may be disposed in the holding hole 13*h* of the bearing support member 13. The outer circumferential surface of the foil holder 21 and the inner circumferential surface of the holding hole 13*h* of the bearing support member 13 may have the gap 24 therebetween. The gap 24 allows the elastic body 14 to become elastically deformed to displace the dynamic bearing 12 in the radial direction of the rotating shaft 11. The function of the elastic body 14 can be reliably exerted by the gap 24.

In the present embodiment, the number of the at least one elastic body 14 may be odd. Such a configuration facilitates a uniform support force to act on the dynamic bearing 12 along the axial direction.

In the present embodiment, the bearing structure 100 may have only one elastic body 14. In this case, the properties of the bearing structure 100, such as the stiffness and the damping properties, can be easily predicted by simulation. Moreover, problems of unavoidable errors, such as dimensional tolerances between parts, are less likely to occur.

In the present embodiment, the at least one elastic body 14 may include a plurality of the elastic bodies 14. All the plurality of elastic bodies 14 may be provided within the range of the length of the bearing surface in the axial direction of the rotating shaft 11. Such a configuration facilitates to avoid the occurrence of an unexpected vibration.

In the present embodiment, the bearing structure 100 may further include the electric motor 26 (or the electric generator) attached to the rotating shaft 11. The foil holder 21 may overlap the electric motor 26 (or the electric generator) in the zone P in the axial direction of the rotating shaft 11. In the zone P, a portion of the foil holder 21 may be surrounded by a portion of the electric motor 26 (or the electric generator). According to such a structure, the rotating shaft 11 can be designed to be short such that a resonance frequency appears at a higher rotational speed.

Embodiment 2

Hereinafter, Embodiment 2 will be described with reference to FIG. 4 and FIG. 5. The same components as those of Embodiment 1 are denoted by the same reference numerals, and detailed description thereof will be omitted.

[2-1. Configuration]

Figure 4:
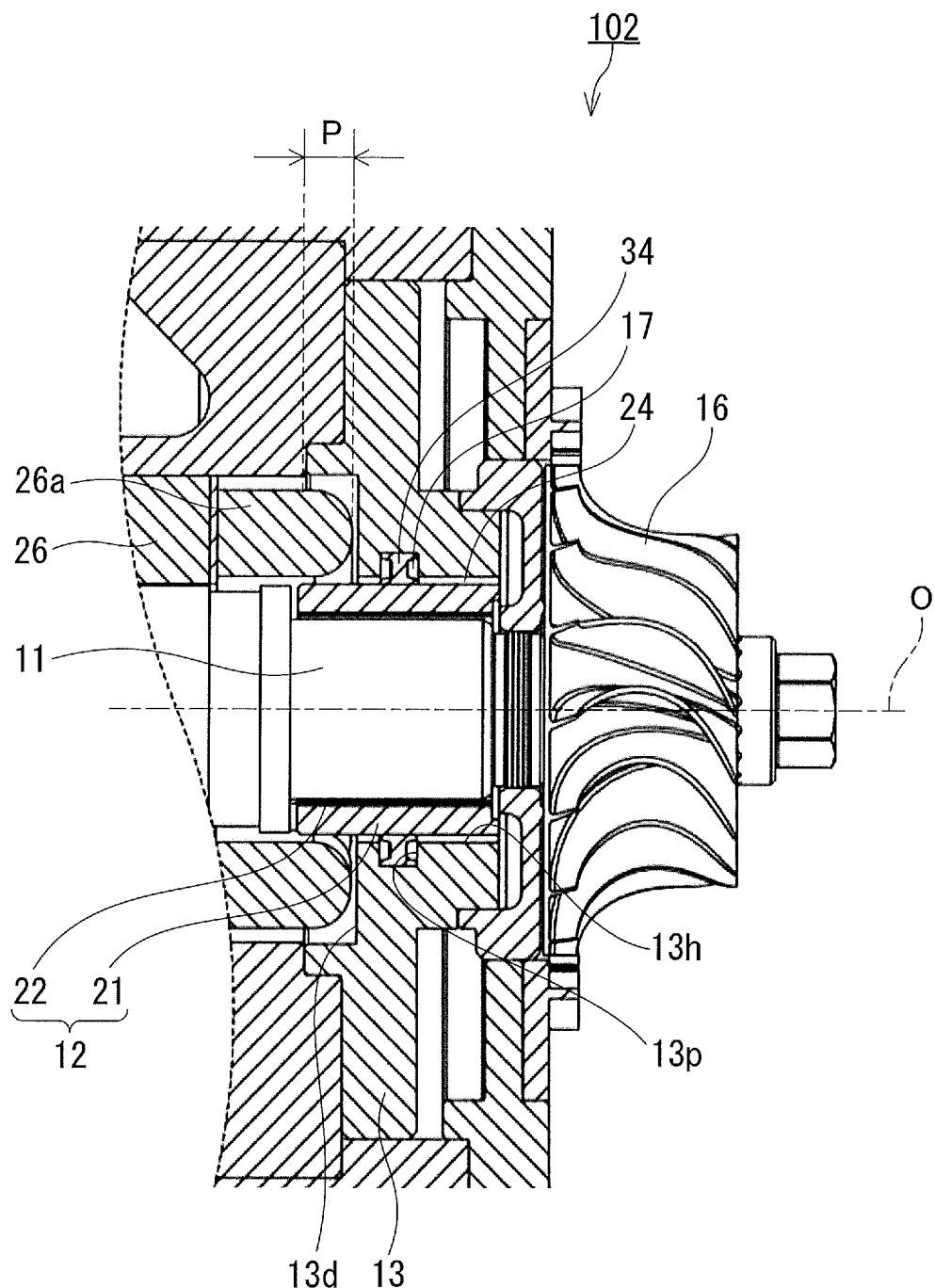
FIG. 4 is a cross-sectional view of a bearing structure according to Embodiment 2.

FIG. 4 is a cross-sectional view of a bearing structure 102 according to Embodiment 2. The bearing structure 102 includes an elastic body 34. The structure of the elastic body 34 according to the present embodiment is different from the structure of the elastic body 14 according to Embodiment 1. Except for this point, the bearing structure 102 of the present embodiment has the same configuration as the bearing structure 100 of Embodiment 1.

In the cross section parallel to the rotating shaft 11 and including the axis O of the rotating shaft 11, the cross-sectional shape of the elastic body 34 is different from the cross-sectional shape of the groove 13*p*. The groove 13*p* has a space 17 allowing deformation of the elastic body 34. Such a configuration reliably guarantees elastic deformation of the elastic body 34. It is also possible to maintain the stiffness of the elastic body 34 constant.

Figure 5:
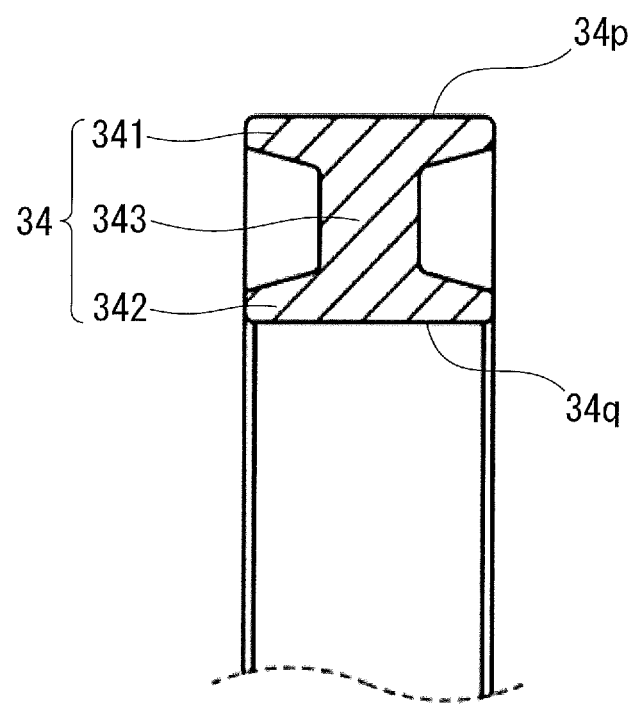
FIG. 5 is a cross-sectional view of an elastic body according to Embodiment 2.

FIG. 5 is a cross-sectional view of the elastic body 34. The elastic body 34 has an outer circumferential portion 341, an inner circumferential portion 342, and an intermediate portion 343. The outer circumferential portion 341 is an annular portion including a radially outer circumferential surface 34*p* in contact with the bearing support member 13. The outer circumferential portion 341 is fitted into the groove 13*p* and is restrained by the groove 13*p*. The inner circumferential portion 342 is an annular portion including a radially inner circumferential surface 34*q* in contact with the foil holder 21. The intermediate portion 343 (strain portion) is an annular portion connecting the outer circumferential portion 341 and the inner circumferential portion 342. In the present embodiment, only the outer circumferential portion 341 is in contact with the bearing support member 13. Only the inner circumferential portion 342 is in contact with the foil holder 21. The intermediate portion 343 is not in contact with either the bearing support member 13 or the foil holder 21. That is, the elastic body 34 has the intermediate portion 343 as a portion that is not in contact with either the bearing support member 13 or the foil holder 21. The dimension of the outer circumferential portion 341 in the axial direction parallel to the rotating shaft 11 is larger than the dimension of the intermediate portion 343 in the axial direction. The dimension of the inner circumferential portion 342 in the axial direction is larger than the dimension of the intermediate portion 343 in the axial direction. In the present embodiment, the elastic body 34 has an H-shaped cross section. Such a configuration allows deformation of the elastic body 34 inside the groove 13*p*, and accordingly the function of the elastic body 34 can be reliably exhibited. That is, it is possible to suppress a rapid increase in stiffness of the bearing structure 102. The "dimension" means the maximum dimension.

The elastic body 34 is less likely to become distorted when fitted into the groove 13p. This facilitates the elastic body 34 to exhibit uniform stiffness in the circumferential direction.

The elastic body 34 may be in contact with the bearing support member 13 by making only the radially outer circumferential surface 34p in contact with the bearing support member 13. The elastic body 34 may be in contact with the foil holder 21 by making only the radially inner circumferential surface 34q in contact with the foil holder 21.

[2-2. Operation]

The operation of the bearing structure 102 configured as described above will be described below.

As described above, rotation of the rotating shaft 11 generates an unbalance force. The intermediate portion 343 of the elastic body 34 is a portion that is not restrained by either the bearing support member 13 or the foil holder 21. Accordingly, when the elastic body 34 becomes deformed due to an unbalance force, the intermediate portion 343 of the elastic body 34 can freely become deformed. By ensuring the space 17 between the elastic body 34 and the bearing support member 13, the stiffness of the elastic body 34 can be maintained constant. This suppresses a rapid increase in stiffness of the bearing structure 102. Even under the conditions that the unbalance force is large and the deformation of the elastic body 34 is large, the stiffness of the bearing structure 102 can be brought close to the value as designed. As a result, resonance in a high-speed rotation range is prevented, and vibration due to the unbalance force is suppressed as well, thereby improving the reliability and the quiet performance of the bearing structure 102.

[2-3. Effects Etc.]

In the present embodiment, at least one selected from the foil holder 21 and the bearing support member 13 may have the groove 13p in which the elastic body 34 is disposed. In the cross section parallel to the rotating shaft 11 and including the axis O of the rotating shaft 11, the cross-sectional shape of the elastic body 34 may be different from the cross-sectional shape of the groove 13p. The groove 13p may have the space 17 allowing deformation of the elastic body 34. Such a configuration reliably guarantees elastic deformation of the elastic body 34.

In the present embodiment, the elastic body 34 may have: the outer circumferential portion 341 including the radially outer circumferential surface 34p in contact with the bearing support member 13; the inner circumferential portion 342 including the radially inner circumferential surface 34q in contact with the foil holder 21; and the intermediate portion 343 connecting the outer circumferential portion 341 and the inner circumferential portion 342. Only the outer circumferential portion 341 may be in contact with the bearing support member 13, and only the inner circumferential portion 342 may be in contact with the foil holder 21. Such a configuration allows deformation of the elastic body 34 inside the groove 13p, and accordingly the function of the elastic body 34 can be reliably exhibited.

Embodiment 3

Hereinafter, Embodiment 3 will be described with reference to FIG. 6 and FIG. 7. The same components as those of Embodiment 1 are denoted by the same reference numerals, and detailed description thereof will be omitted.

[3-1. Configuration]

Figure 6:
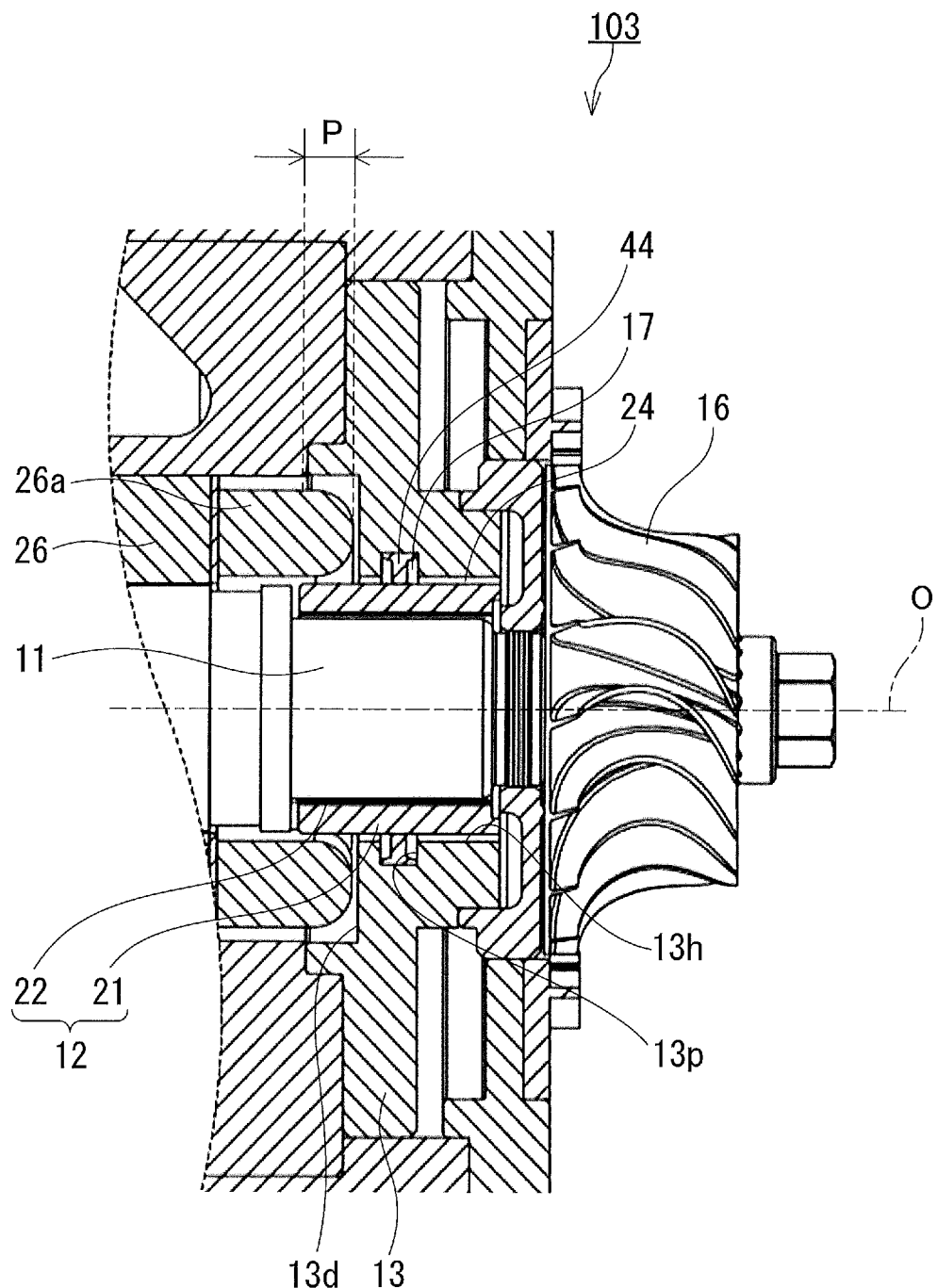
FIG. 6 is a cross-sectional view of a bearing structure according to Embodiment 3.

FIG. 6 is a cross-sectional view of a bearing structure 103 according to Embodiment 3. The bearing structure 103 includes an elastic body 44. The structure of the elastic body 44 according to the present embodiment is different from the structure of the elastic body 14 according to Embodiment 1. Except for this point, the bearing structure 103 of the present embodiment has the same configuration as the bearing structure 100 of Embodiment 1.

In the present embodiment, the elastic body 44 supports the foil holder 21 by being in line contact with the foil holder 21. When the rotating shaft 11 performs a precession motion about the position of the center of gravity, vibration in a mode of applying a large amplitude to the dynamic bearing 12 is induced. At this time, a line contact between the elastic body 44 and the foil holder 21 can cause friction on the contact surface therebetween. As a result, vibration transmitted from the rotating shaft 11 to the dynamic bearing 12 can be damped.

Also in the present embodiment, the cross-sectional shape of the elastic body 44 is different from the cross-sectional shape of the groove 13p. The groove 13p has the space 17 allowing deformation of the elastic body 44.

Figure 7:
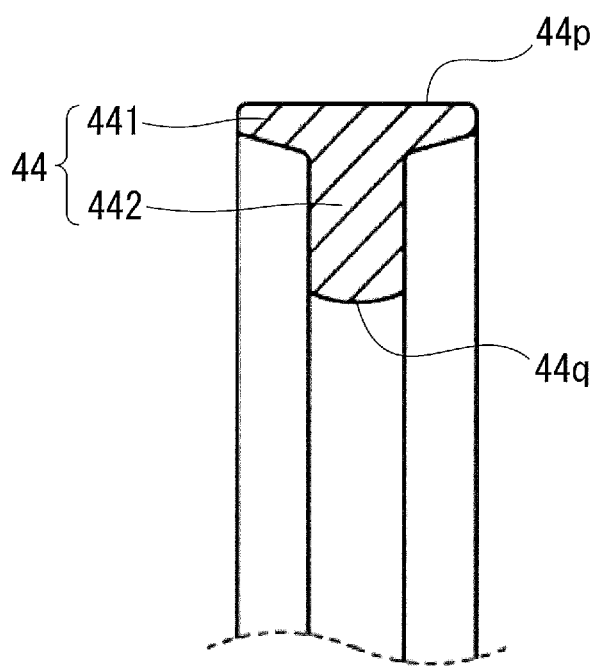
FIG. 7 is a cross-sectional view of an elastic body according to Embodiment 3.

FIG. 7 is a cross-sectional view of the elastic body 44. The elastic body 44 has an outer circumferential portion 441 and an inner circumferential portion 442. The outer circumferential portion 441 is an annular portion including a radially outer circumferential surface 44p in contact with the bearing support member 13. The outer circumferential portion 441 is fitted into the groove 13p and is restrained by the groove 13p. The inner circumferential portion 442 (strain portion) is an annular portion including a radially inner circumferential surface 44q in contact with the foil holder 21. The radially inner circumferential surface 44q is a curved surface having a cross section with an arc-shaped profile. The inner circumferential portion 442 extends in the radial direction from the outer circumferential portion 441 toward the foil holder 21. In the present embodiment, only the outer circumferential portion 441 is in contact with the bearing support member 13. Only the inner circumferential portion 442 is in contact with the foil holder 21. The dimension of the outer circumferential portion 441 in the axial direction parallel to the rotating shaft 11 is larger than the dimension of the inner circumferential portion 442 in the axial direction. In the present embodiment, the elastic body 44 has a T-shaped cross section.

The elastic body 44 is less likely to become distorted when fitted into the groove 13p. This facilitates the elastic body 44 to exhibit uniform stiffness in the circumferential direction.

[3-2. Operation]

As described above, rotation of the rotating shaft 11 generates an unbalance force. The inner circumferential portion 442 of the elastic body 44 is a portion that is not restrained by either the bearing support member 13 or the foil holder 21. Accordingly, when the elastic body 44 becomes deformed due to an unbalance force, the inner circumferential portion 442 of the elastic body 44 can freely become deformed. By ensuring the space 17 between the elastic body 44 and the bearing support member 13, the stiffness of the elastic body 44 can be maintained constant. This suppresses a rapid increase in stiffness of the bearing structure 103. Even under the conditions that the unbalance force is large and the deformation of the elastic body 44 is large, the stiffness of the bearing structure 103 can be brought close to the value as designed. As a result, resonance in a high-speed rotation range is prevented, and vibration due to the unbalance force is suppressed as well, thereby improving the reliability and the quiet performance of the bearing structure 103. Since the elastic body 44 is in line contact with the foil holder 21, friction can occur on the contact surface between the elastic body 44 and the foil holder 21. Accordingly, excellent damping capacity can be imparted to the bearing structure 103.

[3-3. Effects Etc.]

In the present embodiment, the elastic body 44 may support the foil holder 21 by being in line contact with the foil holder 21. Such a configuration enables to cause friction on the contact surface between the elastic body 44 and the foil holder 21, thereby effectively damping vibration transmitted from the rotating shaft 11 to the dynamic bearing 12.

Other Embodiments

As described above, Embodiments 1 to 3 have been described as an illustration of the technique disclosed in the present application. However, the technique according to the present disclosure is not limited these, and can be applied to embodiments obtained by making modifications, replacements, additions, omissions, and the like. Furthermore, the components described in Embodiments 1 to 3 above can be combined to obtain a new embodiment.

Thus, other embodiments will be exemplified below.

The structure of the elastic body is not particularly limited. For example, a plurality of metal springs may be disposed in a cylindrical casing disposed around the foil holder 21. Such a casing can exhibit desired elasticity.

The cross-sectional shape of the elastic body is not limited to the H-shape and the T-shape, and may be a shape designed in consideration of convenience of processing, such as a circular shape or a wedge shape.

The shape of the radially inner circumferential surface of the elastic body is not limited to a curved surface. In the cross section parallel to the rotating shaft 11 and including the axis O of the rotating shaft 11, the elastic body may have a wedge shape with a vertex in contact with the foil holder 21. The number of vertices may be one or plural. That is, in the cross section parallel to the rotating shaft 11 and including the axis axis O of the rotating shaft 11, the radially inner circumferential surface of the elastic body may have a plurality of vertices in contact with a plurality of points positioned along the axial direction.

The other end portion of the rotating shaft 11 can be supported by any bearing. The any bearing may be a dynamic bearing, or may be a bearing of another type, such as a static bearing or a rolling bearing. For example, in the case where both the end portions of the rotating shaft 11 are supported by the respective dynamic bearings 12, the bearing structure of the present embodiment is employable for each of the dynamic bearings 12.

The rotating shaft 11 may be a rotating shaft of a so-called expander-integrated compressor. In the expander-integrated compressor, a turbine wheel can be attached to the one end portion of the rotating shaft 11, an impeller can be attached to the other end portion of the rotating shaft 11. The electric motor 26 can be disposed between the turbine wheel and the impeller. In this type of expander-integrated compressor, the power recovered by the turbine wheel is used for a portion of work by the impeller. In the case where the rotating shaft 11 is shared by the compressor and the expansion turbine, a bearing structure having the same structure (stiffness) as the bearing structure of the expansion turbine can be employed as the bearing structure of the compressor. Of course, the bearing structure of the compressor may be different from the bearing structure of the expansion turbine. The bearing structure of the present embodiment can be employed for at least one of the compressor and the expansion turbine.

Note that the embodiments described above are for illustrating the technique according to the present disclosure, and therefore various modifications, replacements, additions, omissions, and the like can be made within the scope of the claims or the equivalent thereof.

The invention claimed is:

1. A bearing structure comprising:
a rotating shaft;
a dynamic bearing comprising a foil and a foil holder, the foil being disposed around the rotating shaft to constitute a bearing surface, the foil holder holding the foil;
a bearing support member disposed around the dynamic bearing to support the dynamic bearing;
at least one elastic body disposed between the bearing support member and the foil holder; and
an electric motor attached to the rotating shaft or an electric generator attached to the rotating shaft,
wherein
the bearing support member comprises a holding hole extending through in a direction parallel to an axial direction of the rotating shaft,
the foil holder is disposed in the holding hole of the bearing support member,
an outer circumferential surface of the foil holder and an inner circumferential surface of the holding hole of the bearing support member have a gap therebetween, a boundary of the gap being defined by axial ends of the inner circumferential surface of the holding hole of the bearing support member, the gap allowing the elastic body to become elastically deformed to displace the dynamic bearing in a radial direction of the rotating shaft,
a length of the gap in the axial direction is shorter than a length of the bearing surface in the axial direction,
the bearing support member further comprises an annular step portion provided around the holding hole, and
a winding portion of the electric motor or the electric generator is placed in a space ensured by the step portion.

2. The bearing structure according to claim 1, wherein upon receiving a load from the dynamic bearing, the elastic body generates a reaction force corresponding to the load within a range of a length of the bearing surface in an axial direction of the rotating shaft.

3. The bearing structure according to claim 1, wherein the elastic body is a ring-shaped member in contact with the bearing support member and the foil holder around an entire circumference of the ring-shaped member.

4. The bearing structure according to claim 1, wherein at least one selected from the foil holder and the bearing support member comprises a groove in which the elastic body is disposed,
in a cross section parallel to the rotating shaft and including an axis of the rotating shaft, a cross-sectional shape of the elastic body is different from a cross-sectional shape of the groove, and
the groove has a space allowing deformation of the elastic body.

5. The bearing structure according to claim 1, wherein the elastic body comprises:
an outer circumferential portion including a radially outer circumferential surface in contact with the bearing support member;
an inner circumferential portion including a radially inner circumferential surface in contact with the foil holder; and
an intermediate portion connecting the outer circumferential portion and the inner circumferential portion,
only the outer circumferential portion is in contact with the bearing support member, and
only the inner circumferential portion is in contact with the foil holder.

6. The bearing structure according to claim 1, wherein the elastic body supports the foil holder by being in line contact with the foil holder.

7. The bearing structure according to claim 1, wherein the number of the at least one elastic body is odd.

8. The bearing structure according to claim 7, wherein the bearing structure comprises only one elastic body.

9. The bearing structure according to claim 1, wherein the at least one elastic body includes a plurality of the elastic bodies, and
all the plurality of elastic bodies are provided within a range of a length of the bearing surface in an axial direction of the rotating shaft.

10. The bearing structure according to claim 1, wherein
the foil holder overlaps the electric motor or the electric generator in a zone in an axial direction of the rotating shaft, and
in the zone, a portion of the foil holder is surrounded by a portion of the electric motor or the electric generator.

11. The bearing structure according to claim 1, wherein only a portion of the foil holder is placed in the holding hole.

* * * * *